United States Patent
Yoon et al.

(10) Patent No.: US 8,054,972 B2
(45) Date of Patent: Nov. 8, 2011

(54) ENCRYPTION PROCESSOR OF MEMORY CARD AND METHOD FOR WRITING AND READING DATA USING THE SAME

(75) Inventors: Joong-Chul Yoon, Seocho-gu (KR);
Seong-Hyun Kim, Yongin-si (KR);
Sung-hyun Kim, Anyang-si (KR);
Sang-Bum Kim, Suwon-si (KR);
Sang-Wook Kang, Seocho-gu (KR);
Chul-Joon Choi, Suwon-si (KR);
Jong-Sang Choi, Seongnam-si (KR);
Koon-Han Sohn, Yongin-si (KR);
Byung-Yoon Kang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1063 days.

(21) Appl. No.: 11/853,041

(22) Filed: Sep. 11, 2007

(65) Prior Publication Data

US 2008/0075279 A1    Mar. 27, 2008

(30) Foreign Application Priority Data

Sep. 11, 2006    (KR) .................. 10-2006-0087665

(51) Int. Cl.
*H04K 1/00* (2006.01)
(52) U.S. Cl. ........ 380/255; 380/259; 380/260; 380/265; 713/190
(58) Field of Classification Search .................. 380/28, 380/37, 255, 259, 260, 265; 713/190
See application file for complete search history.

(56) References Cited

U.S. PATENT DOCUMENTS

| | | | |
|---|---|---|---|
| 6,158,004 A | 12/2000 | Mason et al. | |
| 2006/0010328 A1 | 1/2006 | Esaka et al. | |
| 2006/0233030 A1* | 10/2006 | Choi | 365/191 |
| 2007/0033337 A1* | 2/2007 | Butt et al. | 711/105 |
| 2007/0033417 A1* | 2/2007 | Gammel et al. | 713/189 |
| 2007/0192592 A1* | 8/2007 | Goettfert et al. | 713/162 |

FOREIGN PATENT DOCUMENTS

| | | |
|---|---|---|
| EP | 1587037 A1 | 10/2005 |
| JP | 2002-328845 | 11/2002 |
| JP | 2002328845 | 11/2002 |
| JP | 2003-256282 | 9/2003 |
| JP | 2005-045760 | 2/2005 |
| KR | 1020050115151 A | 12/2005 |
| WO | 2005/004382 A1 | 1/2005 |

* cited by examiner

*Primary Examiner* — Edward Zee
*Assistant Examiner* — Chi Nguy
(74) *Attorney, Agent, or Firm* — Volentine & Whitt, PLLC

(57) ABSTRACT

An encryption processor, for storing encrypted data in a memory chip of a memory card, includes a FIFO memory for sequentially outputting m-bit data in response to a first signal, and an encryption key generator for generating m-bit encrypted keys (m being a positive integer) in response to a second signal and for sequentially outputting the keys in response to a third signal. A logic operator performs a logic operation on the data from the FIFO memory with the keys from the encryption key generator during a data write operation to sequentially encrypt the data. The logic operator performs a logic operation on the encrypted data received from a memory interface with the keys output from the encryption key generator during a data read operation in order to sequentially decode the encrypted data. The second signal is simultaneously generated with one of the write command or the read command.

33 Claims, 7 Drawing Sheets

"Fig. 4"

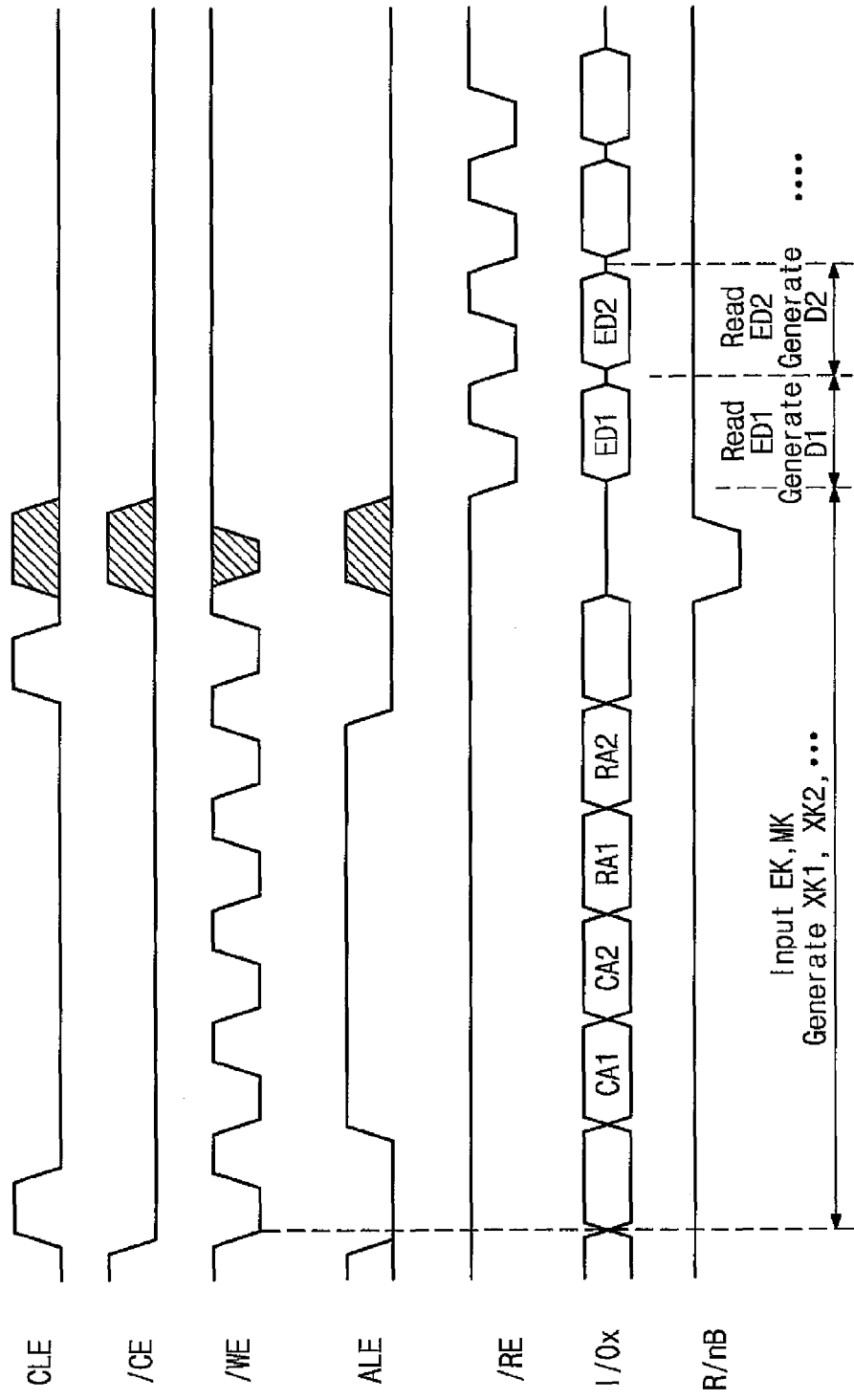

ENCRYPTION PROCESSOR OF MEMORY CARD AND METHOD FOR WRITING AND READING DATA USING THE SAME

CROSS-REFERENCE TO RELATED APPLICATIONS

A claim of priority is made to Korean Patent Application No. 10-2006-0087665, filed on Sep. 11, 2006, the subject matter of which is hereby incorporated by reference.

BACKGROUND OF THE INVENTION

1. Field of the Invention

The present invention relates to a memory card, and more particularly, to an encryption processor of a memory card and a method of writing and reading data using the encryption processor.

2. Description of the Related Art

Memory cards are used in digital devices for writing and reading information. Examples of digital devices are digital cameras, personal digital assistants (PDAs), portable music players, mobile phones, personal computers, etc. A memory card typically includes two chips, such as a flash memory and a control chip. Flash memories, embedded for example in recent, conventional memory cards, have relatively high capacity storage capabilities.

A memory card typically stores data from a digital device in the flash memory unencrypted. However, a flash memory can be dumped by monitoring a bus between the control chip and the flash memory, and the data can be easily intercepted. Accordingly, a control chip may include an encryption processor to encrypt the data to be stored in the flash memory.

An encryption processor typically encrypts predetermined data first, and stores the encrypted data in a first-in-first-out (FIFO) memory in predetermined units. An error correcting code (ECC) value of the data stored in the FIFO memory is calculated and stored in the flash memory. Additionally, when decoding the encrypted data, a flash interface reads the encrypted data from the flash memory, and then stores the encrypted data in the FIFO memory. A central processing unit (CPU) reads the encrypted data from the FIFO memory and delivers the encrypted data to an internal memory, such as a random access memory (RAM), an electrically erasable programmable read only memory (EEPROM) or NOR flash memory. At this point, the encryption processor decodes the encrypted data stored in the internal memory, so that the desired data can be obtained. However, the encryption processor typically takes a relatively long time when encrypting or decoding the data. Also, the CPU may become overloaded.

SUMMARY OF THE INVENTION

An aspect of the present invention provides an encryption processor of a memory card for storing encrypted data in a memory chip. The encryption processor includes a first-in, first-out (FIFO) memory for sequentially outputting m-bit data in response to a first signal, and an encryption key generator for generating m-bit encrypted keys (where m is a positive integer) in response to a second signal and for sequentially outputting the encrypted keys in response to a third signal. A logic operator performs a logic operation on the data output from the FIFO memory and the encrypted keys output from the encryption key generator during a data write operation to sequentially encrypt the data to obtain m-bit encrypted data. The encrypted data is sent to a memory interface. Also, a control circuit generates the first signal, the second signal and the third signal in response to a write command and a write address during the data write operation, the second signal and the write command being simultaneously generated.

The encryption processor may include an error detecting circuit for detecting an error in the encrypted data while the encrypted data is being sent from the logic operator to the memory interface. The error detecting circuit may use an error correcting code (ECC). The encryption key generator may use a data encryption standard (DES). Also, the logic operator may perform an XOR operation and the encrypted keys may be m-bit encrypted XOR keys. The encryption key generator may further include a register for storing the encrypted XOR keys, and an XOR key FIFO memory for temporarily storing the encrypted XOR keys received from the register, and for sequentially outputting the encrypted XOR keys in response to the third signal.

The encryption key generator may receive at least one initialization key in response to the second signal in order to generate the encrypted XOR keys. The encryption key generator may generate the same encrypted XOR keys when the initialization key is the same. Also, the initialization key used for encrypting the data may be used for decoding the encrypted data. The key generator may initially receive the initialization key in response to the second signal in order to generate a first m-bit encrypted XOR key, and may receive at least one of the encrypted XOR keys to generate subsequent m-bit encrypted XOR keys. The initialization keys used for encrypting the data may be stored in a memory.

Another aspect of the present invention provides an encryption processor of a memory card for retrieving m-bit encrypted data stored in a memory chip, including an encryption key generator, a logic operator and a control circuit. The encryption key generator generates m-bit encrypted keys in response to a first signal, and sequentially outputs the encrypted keys in response to a second signal. The logic operator performs a logic operation on the encrypted data sent from a memory interface with the encrypted keys output from the encryption key generator during a data read operation to sequentially decode the encrypted data. The control circuit generates the first and second signals in response to a read command and a data read address during the data read operation, the first signal and the read command being simultaneously generated.

Another aspect of the present invention provides an encryption processor of a memory card storing encrypted data in a memory chip. The encryption processor includes a FIFO memory for sequentially outputting m-bit data in response to a first signal, and an encryption key generator for generating m-bit encrypted keys in response to a second signal and for sequentially outputting the encrypted keys in response to a third signal. The encryption processor also includes a logic operator for performing a logic operation on the data output from the FIFO memory with the encrypted keys output from the encryption key generator during a data write operation in order to sequentially encrypt the data to obtain m-bit encrypted data, which is sent to a memory interface. The logic operator also performs a logic operation on the encrypted data received from the memory interface with the encrypted keys output from the encryption key generator during a data read operation, in order to sequentially decode the encrypted data and send the decoded data to the FIFO memory. A control circuit generates the first signal, the second signal and the third signal in response to a write command and a write address during the data write operation, and generates the second signal and the third signal in response to a read command and a read address during the data read operation. The second signal is simultaneously generated with one of the write command or the read command. The memory chip may include a flash memory, and the memory card may include a subscriber identity module (SIM) card.

Yet another aspect of the present invention provides a method of writing and reading data to and from a memory chip of a memory card using an encryption key for encoding and decoding data, respectively. The method includes simultaneously generating a data write command and a signal to generate m-bit encrypted XOR keys, and generating the encrypted XOR keys at least in response to the generated signal; sequentially performing an XOR operation on m-bit data with the encrypted XOR keys to obtain encrypted data; and storing the encrypted data in the memory chip. The method further includes simultaneously generating a data read command and the signal to generate the encrypted XOR keys, and generating the encrypted XOR keys at least in response to the generated signal; reading the stored encrypted data from the memory chip; sequentially performing the XOR operation on the encrypted data with the encrypted XOR keys to obtain decoded data corresponding to the data; and sending the decoded data to one of an internal device of the memory card or an external device.

The data write command and a write address may be generated in the memory card, the data read command and the encrypted XOR keys may be generated in the memory card. Storing the encrypted data in the memory chip may include sending the data write command, a write address and the encrypted data to the memory card, and reading the stored encrypted data may include sending the data read command and a data read address to the memory card. The encrypted data may be stored in the memory chip in data units. Also, the encrypted data may be stored in a FIFO memory of the memory card.

The method may further include receiving initialization keys, which may be stored, from a central processing unit of the memory card, and generating the encrypted XOR keys when receiving the data write command and the data read command based on the initialization keys. The same encrypted XOR keys may be generated in response to the same initialization keys, and the same initialization keys used for encrypting the data may be used for decoding the stored encrypted data. The encryption key generator may not receive the initialization keys after generating a first m-bit encrypted XOR key of the XOR keys, but may receive the other m-bit encrypted XOR keys of the encrypted XOR keys as an input to continuously generate the encrypted XOR keys. The encrypted XOR keys may be stored in an XOR key FIFO of the encryption key generator.

The method of writing and reading data to and from a memory chip of a memory card may further include generating a first control signal and a second control signal in response to receiving the data write command and the write address. Performing the XOR operation may then include outputting the data from the FIFO memory in response to the first control signal, and outputting the encrypted XOR keys from the XOR key FIFO memory in response to the second control signal. The method may also include detecting data errors while transmitting the encrypted data to the memory chip, and calculating and storing an error correction value corresponding to the encrypted data.

The XOR operation may be performed on second m-bit data using a second m-bit encrypted XOR key to obtain second m-bit encrypted data, while first m-bit encrypted data, encrypted using a first m-bit encrypted XOR key, is being stored in the memory chip by a memory interface. Also, generating the encrypted XOR keys may further include reading the encrypted data from the memory chip in the memory interface according to the data read command and the data read address, as well as correcting data transmission errors according to the stored error correction value when transmitting the encrypted data from the memory interface.

Reading the encrypted data from the memory chip may also include generating a third control signal in response to receiving the data read command and the data read address, such that performing the XOR operation includes outputting the encrypted data from the memory interface in response to the third control signal, and outputting the encrypted XOR key from the XOR key FIFO memory in response to the second control signal. The decoded data may be stored in the FIFO memory.

BRIEF DESCRIPTION OF THE FIGURES

The embodiments of the present invention will be described with reference to the attached drawings, in which:

FIG. 7 is a timing diagram of a flash memory and operations in an encryption processor while reading data, according to an exemplary embodiment of the present invention.

DETAILED DESCRIPTION OF THE EMBODIMENTS

Figure 1:
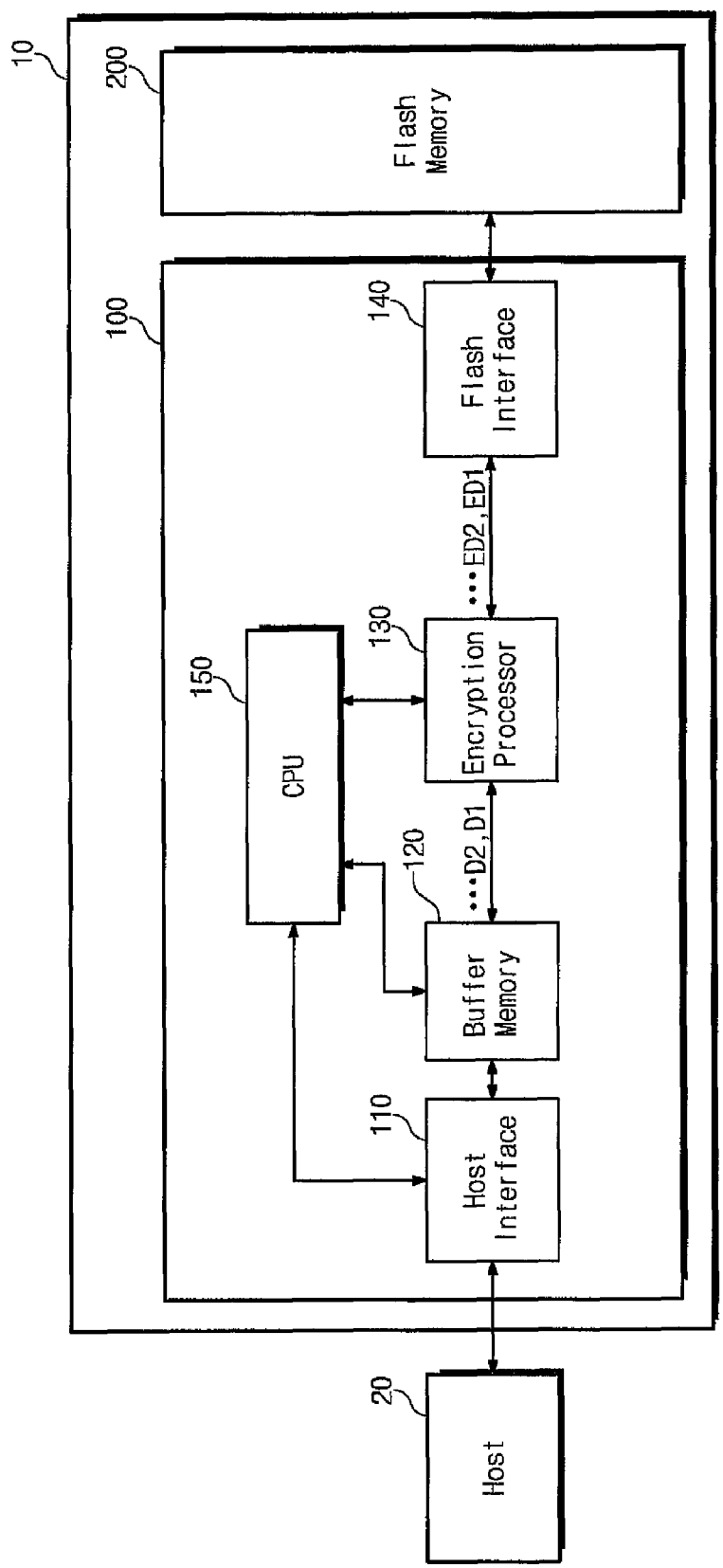
FIG. 1 is a block diagram of a memory card system having an encryption processor, according to an exemplary embodiment of the present invention.

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

FIG. 1 is a block diagram of a memory card system, including an encryption processor, according to an exemplary embodiment of the present invention. The memory card system includes a memory card 10 and a host 20.

The host 20 may be any one of various devices capable of interfacing with a memory card, such as a computer system, a PDA, a digital camera, a mobile phone, a card reader, or the like. The memory card 10 is electrically connected to the host 20, and may be permanent or detachable. The memory card 10 may be any type of memory card incorporating a flash memory, for example, such as a compact flash (CF) card, a smart media (SM) card, a memory stick, a multimedia card (MMC), a secure digital (SD) card, a subscriber identity module (SIM) card, and the like. The host 20 provides data write, read and erase commands to the memory card 10, as well as data address and control signals in accordance with these commands.

The memory card 10 writes data to and reads data from a flash memory 200 in response to the corresponding commands form the host 20. Referring to FIG. 1, the memory card 10 includes a control chip 100 and the flash memory 200. The control chip 100 controls receiving and transmitting data between the host 20 and the flash memory 200. The control chip 100 includes a host interface 110, a buffer memory 120, an encryption processor 130, a flash interface 140 and a central processing unit (CPU) 150.

The host interface 110 provides an interface between the host 20 and the memory card 10. The host interface 110 receives commands, addresses and control signals from the host 20, and delivers them to the CPU 150. The commands may include write, read and erase commands. The host interface 110 may incorporate interfaces having electrical connections in accordance with various standards or criteria, such interfaces including, for example, Personal Computer Memory Card International Association (PCMCLIA), Universal Serial Bus (USB), PlayStation2 (PS2), and the like.

The buffer memory 120 stores data, which will be written to the flash memory 200 or which are read from the flash memory 200. While writing data, the buffer memory 120 receives data to be written from the host interface 110. The buffer memory 120 may be a static random access memory (SRAM), for example.

The encryption processor 130 encrypts the data stored in the buffer memory 120 and delivers the encrypted data to the flash interface 140 in accordance with write operations. The encryption processor 130 also unencrypts (decodes) data read from the flash memory 200 and delivers the unencrypted data to the buffer memory 120 in accordance with read operations.

The flash interface 140 interfaces between the control chip 100 and the flash memory 200. The flash interface 140 sends the data encrypted by the encryption processor 130 to the flash memory 200 during a write operation. Additionally, the flash interface 140 sends encrypted data read from the flash memory 200 to the encryption processor 130 during a read operation.

The CPU 150 is a central processing unit and controls operations of the control chip 100. The CPU 150 controls the host interface 110, the buffer memory 120 and the encryption processor 130 according to commands, addresses and control signals received from the host interface 110.

Figure 2:
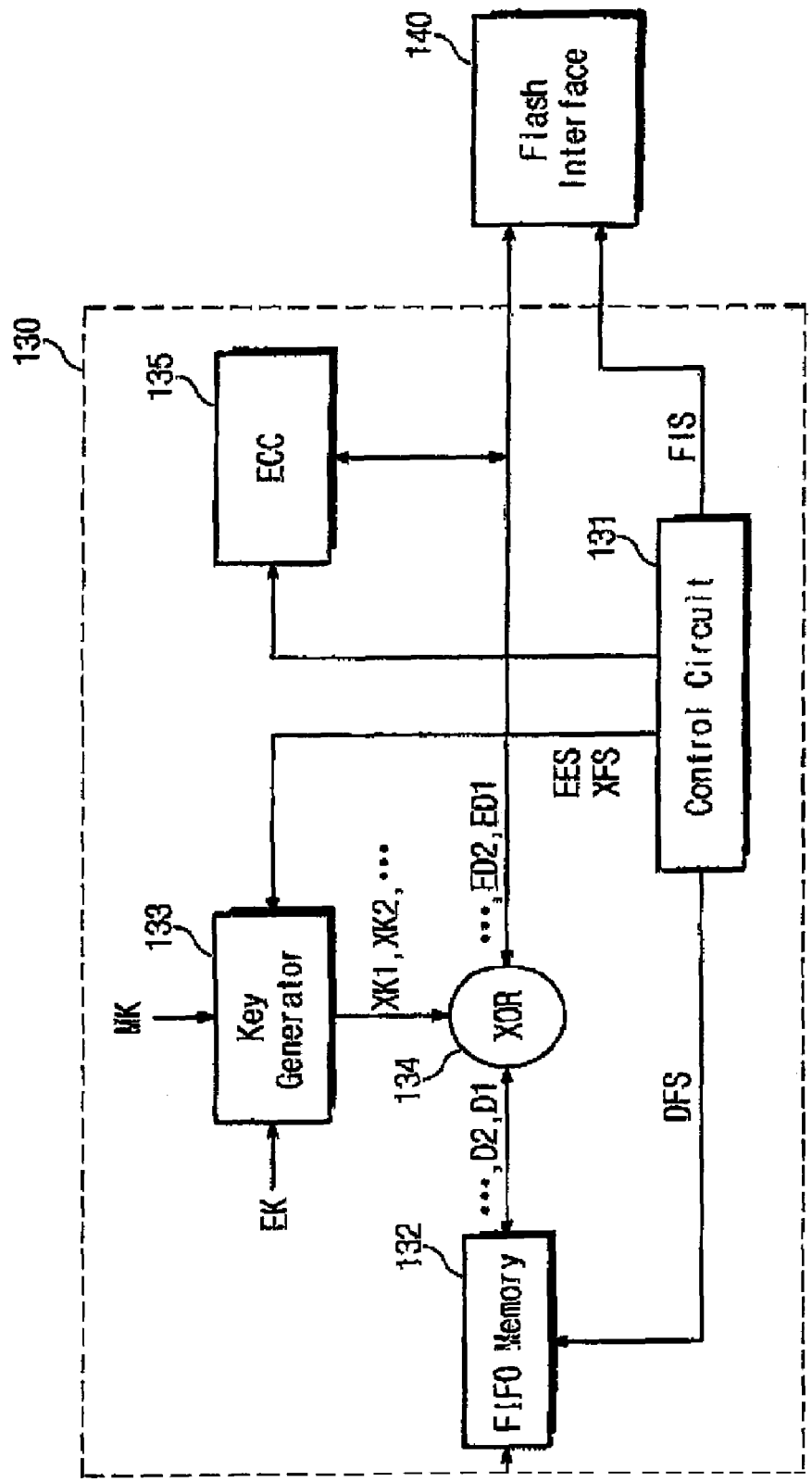
FIG. 2 is a block diagram of an encryption processor, according to an exemplary embodiment of the present invention.

FIG. 2 is a block diagram of the encryption processor 130 according to an exemplary embodiment of the present invention. Referring to FIG. 2, the encryption processor 130 includes a control circuit 131, a first-in-first-out (FIFO) memory 132, an encryption key generator 133, an exclusive OR (XOR) operator 134 and an error correcting circuit (ECC) 135.

The control circuit 131 receives commands and addresses corresponding to data write, read and erase operations from the CPU 150, and generates control signals DFS, EES, XFS and FIS in response. The control circuit 131 controls the FIFO memory 132, the encryption key generator 133 and the error correcting circuit 135 of the encryption processor 130, as well as the flash interface 140, according to the control signals DFS, EES, XFS and FIS.

The FIFO memory 132 is a storage device configured to output data in the same order the data is input (e.g., to first output the data that is first input). The FIFO memory 132 operates by means of a first-in-first-out list.

The FIFO memory 132 includes multiple m byte registers (not shown). During a write operation, the FIFO memory 132 sequentially receives m byte data D1, D2, . . . from the buffer memory 120 in response to the control signal DFS from the control circuit 131. The FIFO memory 132 then sequentially transmits the received m byte data D1, D2, . . . to the XOR operator 134. During a read operation, the FIFO 132 sequentially receives m byte data D1, D2, . . . from the XOR operator 134 in response to the control signal DFS from the control circuit 131, and then sequentially transmits the received m byte data D1, D2, . . . to the buffer memory 120. The control circuit 131 receives data write and data read commands for the flash memory 200 from the CPU 150 to generate the control signal DFS, and sends the control signal DFS to the FIFO memory 132 in response.

The encryption key generator 133 generates x bytes of XOR keys, or predetermined m-bit XOR keys (where m is a positive integer), which may be encrypted, in response to the control signal EES. More specifically, the encryption key generator 133 receives an encryption key EK and a master XOR key MK from the CPU 150 to generate multiple encrypted XOR keys XK1, XK2, . . . . When receiving the same encryption key EK and the same master XOR key MK from the CPU 150, the encryption key generator 133 generates the same XOR keys XK1, XK2, . . . . The encryption key generator 133 may include registers (not shown) for storing the multiple XOR keys XK1, XK2, . . . .

The encryption key EK and the master XOR key MK may be generated through the CPU 150, or an additional initialization key (not shown). The encryption key EK and the master XOR key MK used for encrypting predetermined m-bit data (where m is a positive integer) are identically used for decrypting the encrypted predetermined data. In order to accomplish this, the CPU 150 or an initialization key generator (not pictured) stores the encryption key EK and the master XOR key MK delivered to the encryption key generator 133, while encrypting the data. When decoding the encrypted data, the CPU 150 or the initialization key generator delivers the stored encryption key EK and the master XOR key MK in the encryption key generator 133. In an embodiment, the initialization key generator may be incorporated into the encryption key generator 133.

During a data write operation, the XOR operator 134 sequentially performs an XOR operation on the data D1, D2, . . . , provided by the FIFO memory 132, with the XOR keys XK1, XK2, . . . , generated by the encryption key generator 133, to provide encrypted data ED1, ED2, . . . . The XOR operator 134 sends the XOR operation results to the flash interface 140. The encrypted data ED1, ED2, . . . resulting from the XOR operation satisfy the following Equation 1, in which "U" indicates an XOR operation:

$$D1 U XK1 = ED1$$

$$D2 U XK2 = ED2$$

$$\ldots$$

$$Dm U XKm = EDm \qquad \text{(Equation 1)}$$

During a data read operation, the XOR operator 134 performs an XOR operation on the encrypted data ED1, ED2, . . . provided by flash interface 140, with the XOR keys XK1, XK2, . . . generated by the encryption key generator 133. In the data read operation, the XOR keys XK1, XK2, . . . generated from the encryption key generator 133 are identical to the XOR keys XK1, XK2, . . . used for previously encrypting the data D1, D2, . . . . The reason is that the CPU 150 or the initialization key generator delivers the same encryption key EK and master XOR key MK during the data write operation and the data read operation. Accordingly, the XOR operation results are the decoded data D1, D2, . . . . The decoded data D1, D2, satisfy the following Equation 2 according to the XOR operation property.

$$ED1 U XK1=(D1 U XK1) U XK1=D1$$

$$ED2 U XK2=(D2 U XK2) U XK2=D2$$

$$\ldots$$

$$EDm U XKm=(Dm U XKm) U XKm=Dm \quad \text{(Equation 2)}$$

The error correcting circuit (ECC) 135 is connected between the flash interface 140 and the XOR operator 134 to correct transmission errors that may occur when the encrypted data ED1, ED2, . . . are transmitted. The error correcting circuit 135 calculates an error correcting code value of the encrypted data ED1, ED2, . . . and then stores it in the flash interface 140. The error correcting circuit 135 compares the error correcting code value with data during a data read operation to correct the data transmission error.

However, the error correcting circuit 135 may only detect errors when the encrypted data ED1, ED2, . . . are being transmitted. In order to correct the detected errors, the error correcting circuit 135 remembers a bit with an error in the encrypted data ED1, ED2, . . . . Then, an XOR operation is performed on the encrypted data ED1, ED2, . . . with the XOR keys XK1, 2, . . . for decoding the read data. At this point, it may be determined that the decoded data D1', D2', . . . (corresponding tot the original data D1, D2, . . . ) have errors. To correct the errors, the CPU 150 receives each bit identified as having an error from the error correcting circuit 135, and then corrects the corresponding bit in the decoded data D1', D2', . . . . The corresponding bit error changes from logic 0 to logic 1 or from logic 1 to logic 0, according to the XOR operation property.

The encryption processor 130 simultaneously provides write and read commands and generates the XOR keys XK1, XK2, . . . while writing and reading data to and from the flash memory 200. The encryption processor 130 performs an XOR operation on the data D1, D2, . . . , with the XOR keys XK1, XK2, . . . generated during a data write operation to deliver the encrypted data ED1, ED2, . . . . Additionally, the encryption processor 130 performs an XOR operation on the encrypted data ED1, ED2, . . . with the same XOR keys XK1, XK2, . . . used in the data write operation to decode the encrypted data ED1, ED2, . . . during a data read operation. The decoded data are then sent to the buffer memory 120. Accordingly, the time needed for encrypting the data D1, D2, . . . and/or decoding the encrypted data ED1, ED2, . . . is reduced, as compared to conventional methods.

The memory card using a conventional encryption processor uses a buffer memory as an intermediate medium for encrypting data or decoding encrypted data. However, the encryption processor 130 of the present embodiment does not require the buffer memory for encrypting data or decoding the encrypted data. Therefore, the memory card using the encryption processor 130 of the present embodiment requires fewer tasks of the CPU 150, as compared to conventional memory cards.

Figure 3:
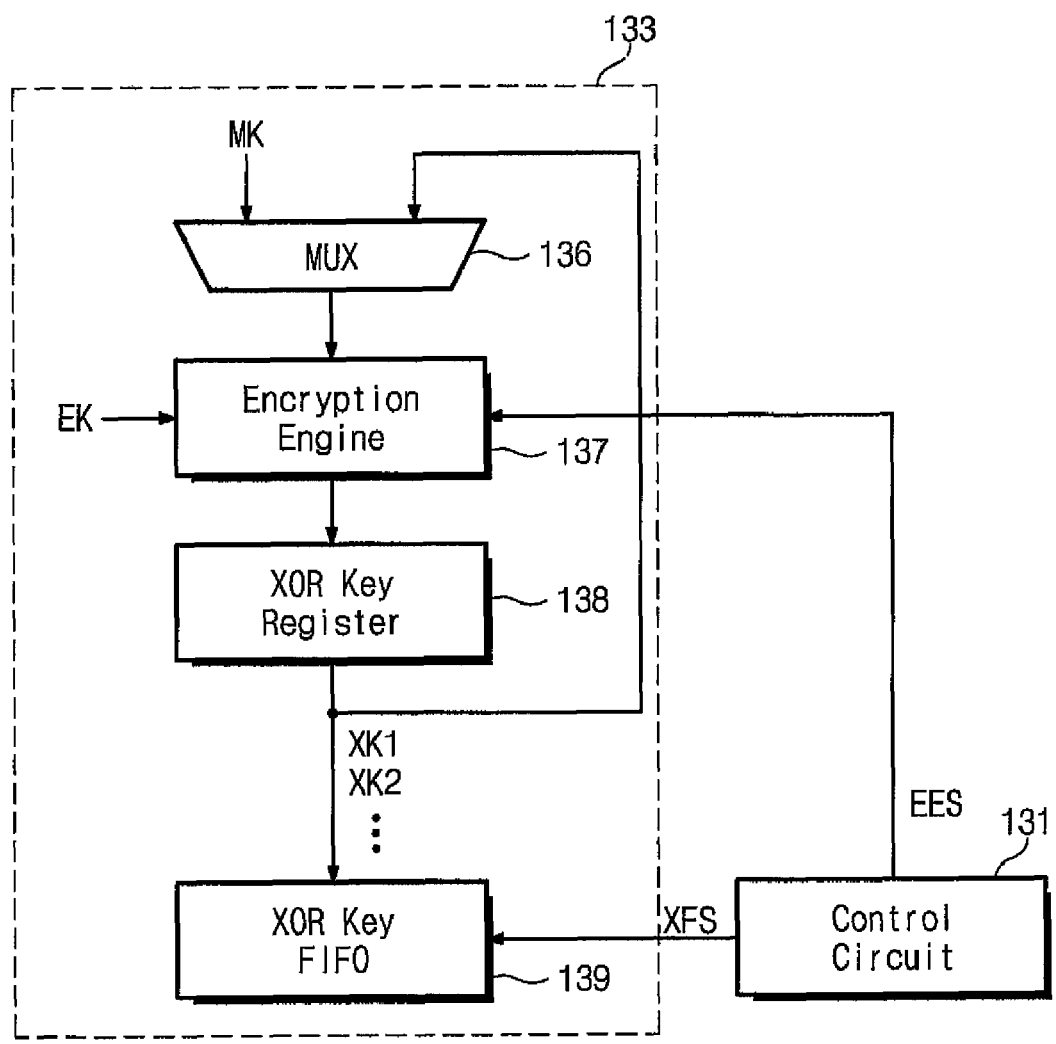
FIG. 3 is a block diagram of an encryption key generator, according to an exemplary embodiment of the present invention.

FIG. 3 is a block diagram of the encryption key generator 133 of FIG. 2, according to an exemplary embodiment of the present invention. Referring to FIG. 3, the encryption key generator 133 includes a multiplexer 136, an encryption engine 137, an XOR key register 138 and an XOR key FIFO memory 139.

Referring to FIG. 3, the encryption key generator 133 receives an encryption key EK and a master XOR key MK from the CPU 150 to generate multiple XOR keys XK1, XK2 . . . .

The multiplexer 136 selects one of the master XOR key MK delivered from the CPU 150 and the generated XOR keys XK1, XK2, . . . . The selected key(s) is provided to the encryption engine 137. The encryption engine 137 receives the encryption key EK from the CPU 150 and the key(s) delivered from the multiplexer 136, and sequentially generates the XOR keys XK1, XK2. The XOR register 138 stores the XOR keys XK1, XK2, . . . , which are generated by the encryption engine 137.

In an embodiment, the encryption engine 137 may use a data encryption standard (DES), for example, to generate the XOR keys XK1, XK2, . . . . The DES is an encryption tool developed by IBM, and is a public encryption system adopted by the U.S. National Bureau of Standards in 1974. A DES algorithm includes permutation, substitution and a modulo operation. The security of the public encryption system entirely depends on the keys. That is, encrypted data can not be decoded into original data without the keys, and the keys can not be determined even when the encrypted data and the original data are present. A one-way function, i.e., a hamming function, is used in an encryption field. In the one-way function, y can be easily obtained by x, but x can not be obtained by y, in y=f(x). That is, the encrypted data can be obtained from the original data by using the key, but the original data can not be obtained from the encrypted data without the key.

The XOR key FIFO memory 139 temporarily stores the XOR keys XK1, XK2, . . . stored in the XOR register 138. The XOR key FIFO memory 139 sequentially transmits the XOR keys XK1, XK2, . . . into the XOR operator 134 in response to the control signal XFS.

Figure 4:
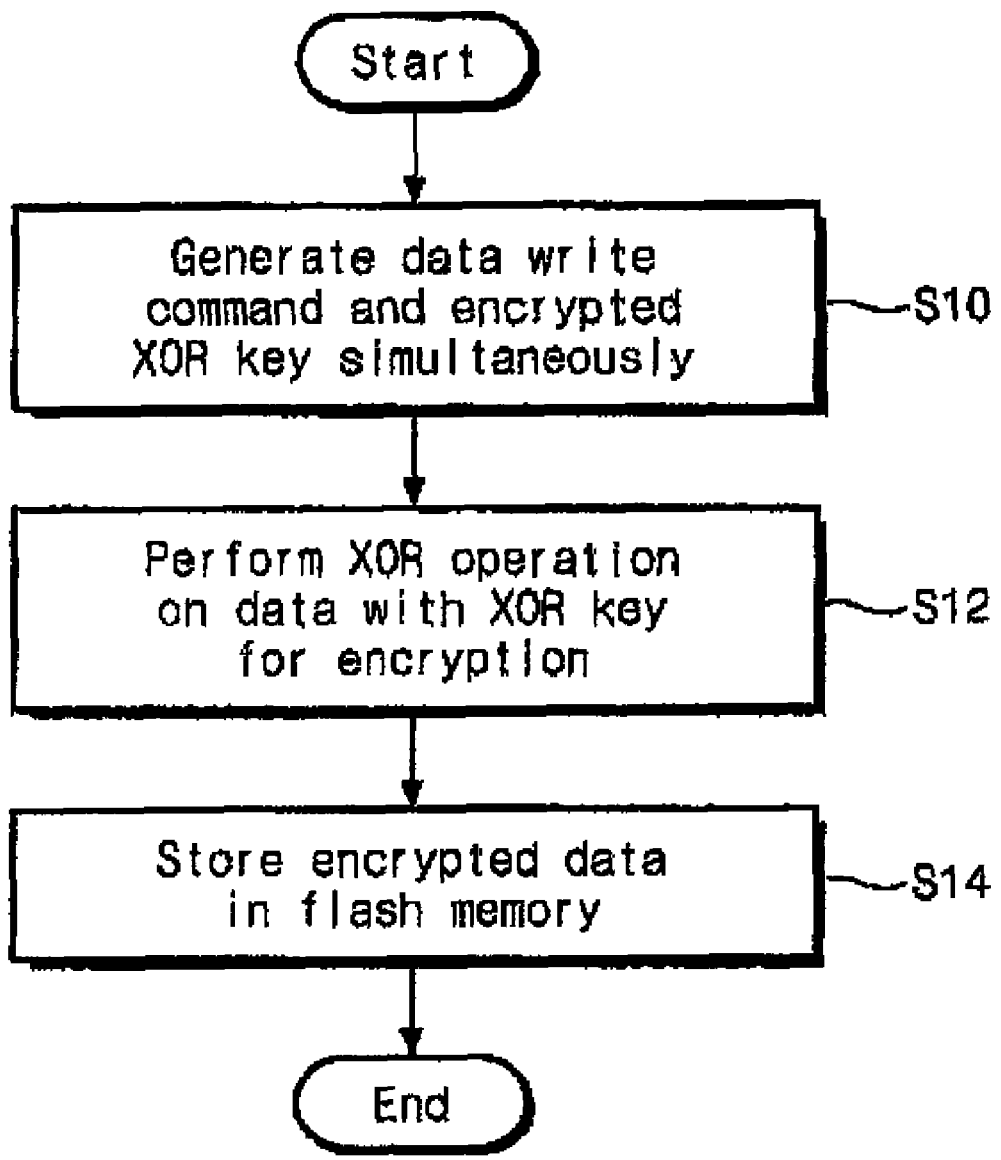
FIG. 4 is flowchart illustrating a method of writing data using an encryption processor, according to an exemplary embodiment of the present invention.
Figure 5:
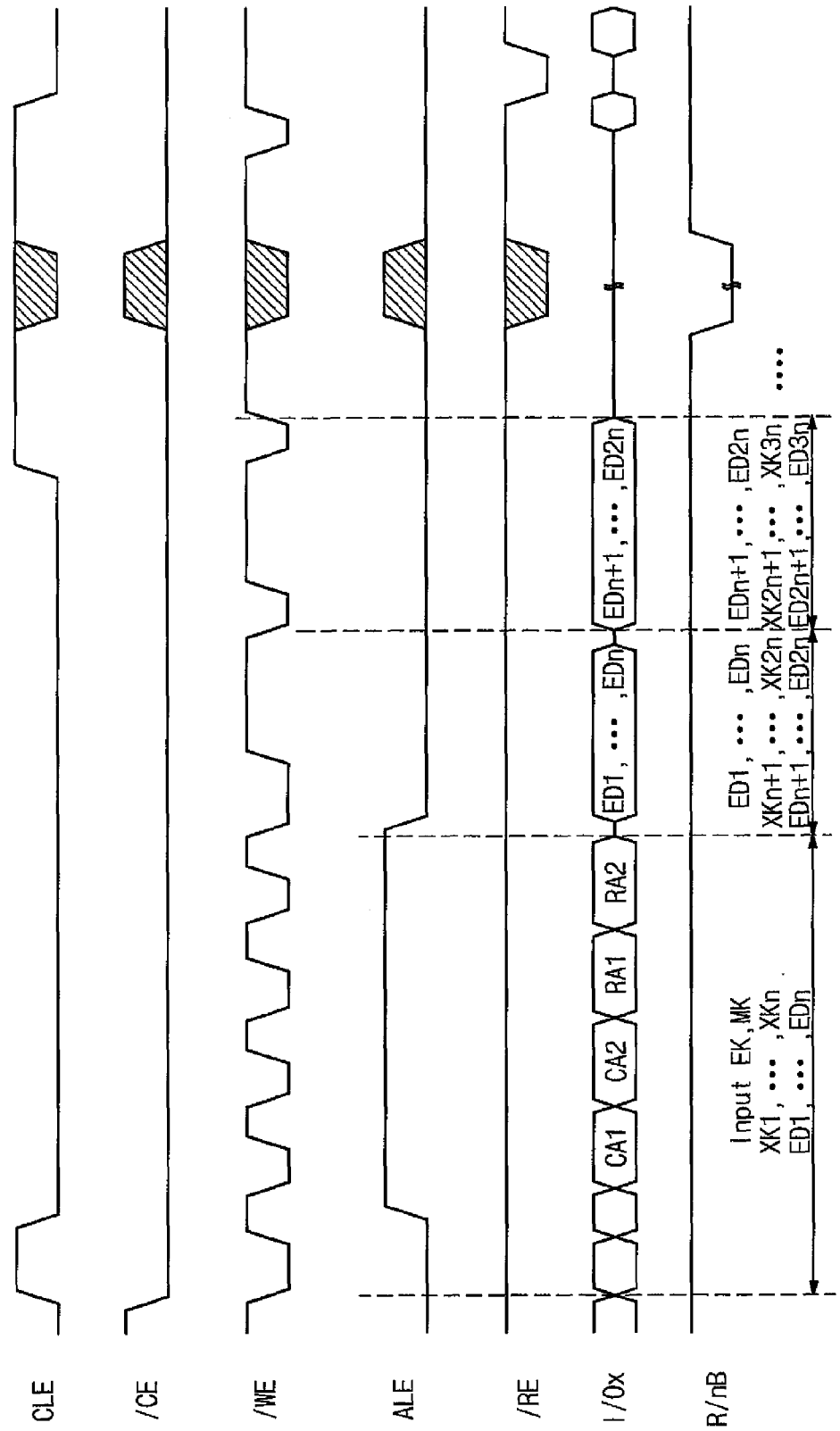
FIG. 5 is a timing diagram of a flash memory and operations in an encryption processor while writing data, according to an exemplary embodiment of the present invention.

FIG. 4 is flowchart illustrating a method of writing data using the encryption processor 130, according to an exemplary embodiment of the present invention. FIG. 5 is a timing diagram of the flash memory 200 and the corresponding operations in the encryption processor 130 while writing data. FIG. 5 indicates the operations in the encryption processor 130 in relation to exemplary signaling on known pins, such as the control pins command latch enable (CLE), address latch enable (ALE), chip enable (/CE), write enable (/WE) and read enable (/RE), as well as the data input/output pins (I/Ox). Referring to FIGS. 4 and 5, a method of writing the data to the flash memory is as follows.

In step S10, a data write command and XOR keys are generated, which may occur simultaneously. In particular, during a data write operation, the CPU 150 sends the data write command and addresses to the control circuit 131 of the encryption processor 130. The CPU 150 also causes the data which is to be written to the flash memory 200 to be sent from the host interface 110 to the buffer memory 120. The data stored in the buffer memory 120 are then sent to the FIFO memory 132, where it is stored, e.g., in predetermined units. Additionally, the CPU 150 sends the keys EK and MK to the encryption key generator 133, which are used for encrypting the data to be written in the flash memory 200. The CPU 150 may store the sent keys EK and MK in a register (not shown). The XOR keys are generated, using the keys EK and MK, in response to a control signal EES sent from the control circuit 131. The control signal EES may be generated and/or sent simultaneously with the write command.

The encryption key generator 133 that receives the keys EK and MK from the CPU 150 generates XOR keys XK1, XK2, . . . . Referring to FIG. 5, the XOR keys XK1, XK2, . . . are generated in each step and may be may be predetermined. Referring to FIG. 5, the encryption key generator 133 generates XOR keys XK1, . . . , XKn before an address is sent to the flash memory 200. The generated XOR keys XK1, . . . , XKn are stored in the XOR key FIFO memory 139 of the encryption key generator 133.

At this point, the XOR operator 134 receives the previously stored data D1, . . . , Dn from the FIFO memory 132 in response to the control signal DFS, and receives the previously stored XOR keys XK1, . . . , XKn from the XOR key FIFO memory 139 in response to the control signal XFS. Then, as indicated by step S12 of FIG. 4, the XOR operator 134 performs an XOR operation on the data D1, . . . , Dn with the XOR keys XK1, . . . , XKn in order to generate encrypted data ED1, . . . , EDn. In response to a control signal FIS, the encrypted data ED1, . . . , EDn are stored in the flash memory 200 in step S14.

Referring to FIG. 5, while storing the encrypted data ED, . . . EDn in the flash memory 200, the encryption key generator 133 of the encryption processor 130 generates XOR keys XK(n+1), . . . , XK(2n), which are stored in the XOR key FIFO memory 139. The XOR operator 134 performs an XOR operation on the data D(n+1), . . . , D(2n) with the XOR keys XK(n+1), . . . , XK(2n) to generate the encrypted data ED(n+1), . . . , ED(2n).

Likewise, while storing the generated encrypted data ED(n+1), . . . , ED(2n) in the flash memory 200, the encryption key generator 133 generates XOR keys XK(2n+1), . . . , XK(3n), which are stored in the XOR key FIFO memory 139. The XOR operator 134 then performs an XOR operation on the data D(2n+1), . . . , D(3n) with the XOR keys XK(2n+1), . . . XK(3n) to generate encrypted data ED(2n+1), . . . ED(3n).

Referring again to FIG. 5, successive sets XOR keys are generated while (or after) a set of data is encrypted and sent to the flash memory 200 to be stored. However, the present invention is not limited to this embodiment. The encryption key generator 133 may generate multiple sets of XOR keys during a data write command, and then store them in the XOR key FIFO memory 139.

As stated above, in step S12 of FIG. 4, an XOR operation is performed on the data with the XOR keys. More particularly, the control circuit 131 generates the control signals DFS and XFS, which it respectively transmits to the FIFO memory 132 and the XOR key FIFO memory 139 of the key generator 133. In response to the control signal DFS, the FIFO memory 132 sends previously stored data to the XOR operator 134. In response to the control signal XFS, the XOR key FIFO memory 139 sends a previously stored XOR key to the XOR operator 134. The XOR operator 134 performs an XOR operation on the data with the XOR key in order to generate the encrypted data.

In step S14, the encrypted data ED1, ED2, . . . are stored in the flash memory 200. The flash memory 200 of FIG. 1 is shown as being separate from the control chip 100, but the present invention is not limited to that configuration. For example, the memory card 10 may include control chip 100 and the flash memory 200 in one chip, without departing from the spirit and scope of the present invention.

Figure 6:
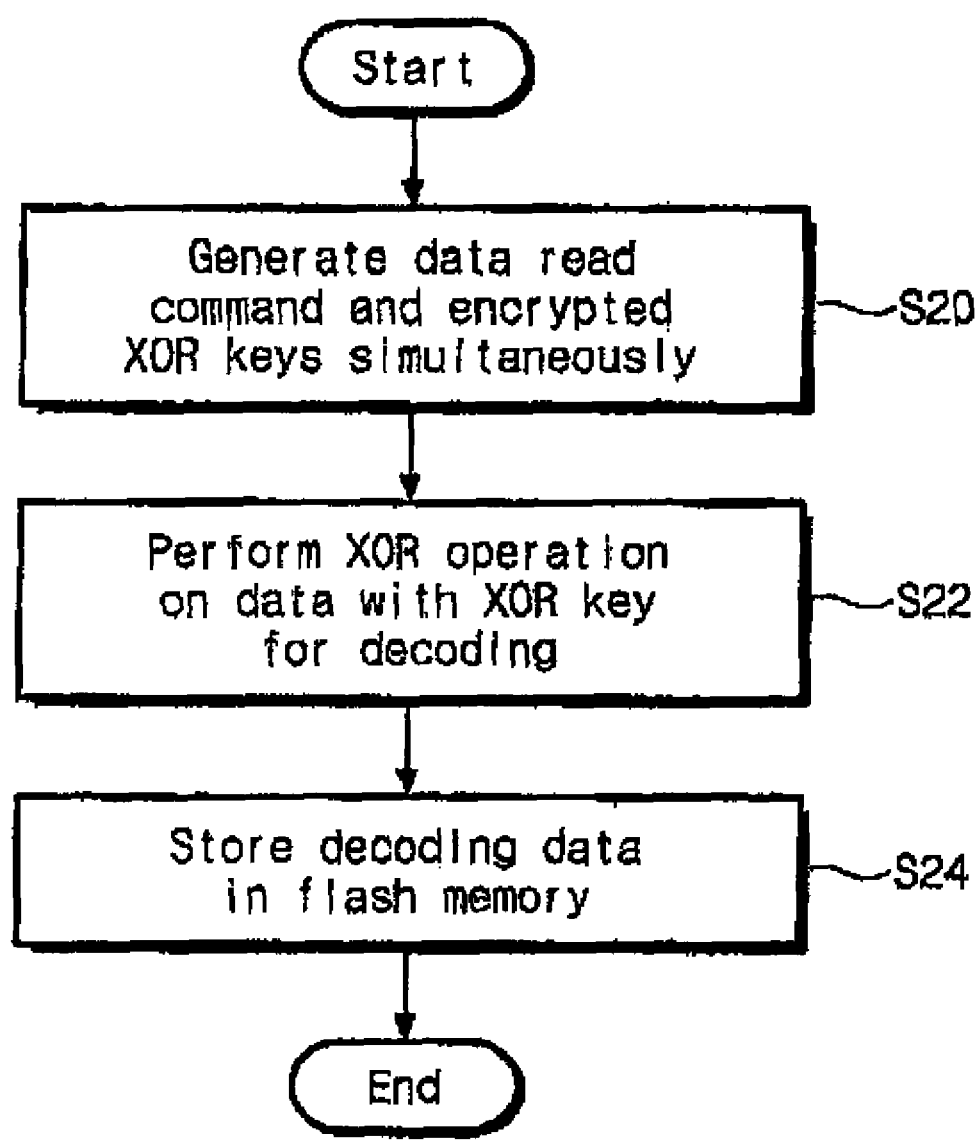
FIG. 6 is a flowchart illustrating a method of reading data using an encryption processor, according to an exemplary embodiment of the present invention.

FIG. 6 is a flowchart illustrating a method of reading data using an encryption processor 130, according to an exemplary embodiment of the present invention. FIG. 7 is a timing diagram of a flash memory and corresponding operations in an encryption processor 130 while reading data. Referring to FIGS. 6 and 7, a method of reading data from the flash memory 200 is as follows.

In step S20, the data read command and XOR keys XK1, XK2, . . . are generated, which may occur simultaneously. During a data read operation, the CPU 150 sends the data read command and an address to the control circuit 131. The CPU 150 sends the keys EK and MK to the encryption key generator 133, which were used for encrypting the data. Accordingly, the keys EK and MK used for encryption are used to decode encrypted data. The encryption key generator 133 receives the encryption key EK, and the master XOR key MK from the CPU 150 in order to generate multiple XOR keys XK1, XK2, . . . . The XOR keys may be generated, using the keys EK and MK, in response to the control signal EES sent from the control circuit 131. The control signal EES may be generated and/or sent simultaneously with the data read command.

Referring to FIG. 7, after inputting a data read command, there is enough time for generating the XOR keys XK1, XK2, . . . until the data are read. The generated XOR keys XK1, XK2, . . . are stored in the XOR key FIFO memory 139.

In step S22, an XOR operation is performed on the encrypted data with the predetermined XOR key for decoding. The control circuit 131 receives a data read command from the CPU 150 and an address in order to generate the control signals FIS and XFS. In response to the control signal FIS, the flash interface 140 sequentially transmits the predetermined encrypted data ED1, ED2, . . . into the XOR operator 134, as illustrated in FIG. 7. Further, in response to the control signal XFS, the predetermined XOR keys XK1, XK2, . . . stored in the XOR key FIFO memory 139, are sequentially transmitted into the XOR operator 134. The XOR operator 134 performs an XOR operation on the encrypted data ED1, ED2, . . . with the XOR keys XK1, XK2, . . . in order to decode the encrypted data ED1, ED2, . . . to obtain decoded data D1, D2, . . . . The decoded data D1, D2, . . . are sent to the FIFO memory 132.

In step S24 of FIG. 6, the decoded data D1, D2, . . . are sent to an external device, such as the host 20 or an internal block of the control chip 100, for example. The CPU 150 causes the data stored in the FIFO memory 132 in step S22 to be sent to the buffer memory 120. The data transmitted to the buffer memory 120 may pass through the CPU 150, and are then sent to the external device.

According to an encryption processor and the method for writing and reading data using the encryption processor of the present invention, XOR keys are generated while writing and reading data, such that data can be encrypted or decrypted quickly, as compared to traditional methods. Furthermore, the CPU will be required to perform fewer tasks.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. An encryption processor of a memory card for storing encrypted data in a memory chip, the encryption processor comprising:
   a first-in, first-out (FIFO) memory for sequentially outputting m-bit data (m being a positive integer) in response to a first control signal;
   an encryption key generator for generating m-bit encrypted XOR keys in response to a second control signal and for sequentially outputting the encrypted XOR keys in response to a third control signal;
   a logic operator for performing an XOR operation on the data output from the FIFO memory and the encrypted XOR keys output from the encryption key generator during a data write operation to sequentially encrypt the data to obtain m-bit encrypted data, the encrypted data being sent to a memory interface; and a control circuit for generating the first control signal, the second control signal and the third control signal in response to a write command and a write address during the data write operation, the first control signal being provided to the FIFO memory, and the second and third control signals being provided to the encryption key generator.

2. The encryption processor of claim 1, further comprising:
an error detecting circuit for detecting an error in the encrypted data while the encrypted data is being sent from the logic operator to the memory interface.

3. The encryption processor of claim 2, wherein the error detecting circuit uses an error correcting code (ECC).

4. The encryption processor of claim 1, wherein the encryption key generator uses a data encryption standard (DES).

5. The encryption processor of claim 1, wherein the encryption key generator receives at least one initialization key in response to the second control signal in order to generate the encrypted XOR keys.

6. The encryption processor of claim 5, wherein the encryption key generator generates the same encrypted XOR keys when the at least one initialization key is the same.

7. The encryption processor of claim 6, wherein the at least one initialization key used for encrypting the data is used for decoding the encrypted data.

8. The encryption processor of claim 7, further comprising:
a memory for storing the initialization keys used for encrypting the data.

9. The encryption processor of claim 5, wherein the encryption key generator initially receives the at least one initialization key in response to the second control signal in order to generate a first m-bit encrypted XOR key, and receives at least one of the encrypted XOR keys to generate subsequent m-bit encrypted XOR keys.

10. The encryption processor of claim 9, wherein the encryption key generator comprises:
a register for storing the encrypted XOR keys; and
an XOR key FIFO memory for temporarily storing the encrypted XOR keys received from the register, and for sequentially outputting the encrypted XOR keys in response to the third control signal.

11. The encryption processor of claim 1, wherein the memory chip comprises a flash memory.

12. The encryption processor of claim 1, wherein the memory card comprises a subscriber identity module (SIM) card.

13. An encryption processor of a memory card for retrieving m-bit encrypted data (m being a positive integer) stored in a memory chip, the encryption processor comprising:
an encryption key generator for generating m-bit encrypted XOR keys (m being a positive integer) in response to a first control signal, and for sequentially outputting the encrypted XOR keys in response to a second control signal;
logic operator for performing an XOR operation on the encrypted data sent from a memory interface with the encrypted XOR keys output from the encryption key generator during a data read operation to sequentially decode the encrypted data; and
a control circuit for generating the first and second control signals in response to a read command and a data read address during the data read operation, and providing the first and second control signals to the encryption key generator.

14. An encryption processor of a memory card storing encrypted data in a memory chip, the encryption processor comprising:
a FIFO memory for sequentially outputting m-bit data (m being a positive integer) in response to a first control signal;
an encryption key generator for generating m-bit encrypted XOR keys in response to a second control signal, and for sequentially outputting the encrypted XOR keys in response to a third control signal;
a logic operator for performing a logic operation on the data output from the FIFO memory with the encrypted XOR keys output from the encryption key generator during a data write operation in order to sequentially encrypt the data to obtain m-bit encrypted data and to send the encrypted data to a memory interface, and for performing a logic operation on the encrypted data received from the memory interface with the encrypted XOR keys output from the encryption key generator during a data read operation in order to sequentially decode the encrypted data and send the decoded data to the FIFO memory; and
a control circuit for generating the first control signal, the second control signal and the third control signal in response to a write command and a write address during the data write operation, and for generating the second control signal and the third control signal in response to a read command and a read address during the data read operation.

15. A method of writing and reading data to and from a memory chip of a memory card using an encryption key for encoding and decoding data, respectively, the method comprising:
simultaneously generating a data write command and a signal to generate m-bit encrypted XOR keys (m being a positive integer), and generating the encrypted XOR keys at least in response to the generated signal;
sequentially performing an XOR operation on m-bit data (m being a positive integer) with the encrypted XOR keys to obtain m-bit encrypted data;
storing the encrypted data in the memory chip;
simultaneously generating a data read command and the signal to generate the encrypted XOR keys, and generating the encrypted XOR keys at least in response to the generated signal;
reading the stored encrypted data from the memory chip;
sequentially performing the XOR operation on the encrypted data with the encrypted XOR keys to obtain m-bit decoded data corresponding to the data; and
sending the decoded data to one of an internal device of the memory card or an external device.

16. The method of claim 15, wherein storing the encrypted data in the memory chip comprises:
generating the data write command and a write address in the memory card.

17. The method of claim 15, wherein generating the data read command and the encrypted XOR keys comprises generating a data read command and a data read address in the memory card.

18. The method of claim 15, wherein storing the encrypted data in the memory chip comprises sending the data write command, a write address and the encrypted data to the memory card, and wherein reading the stored encrypted data comprises sending the data read command and a data read address to the memory card.

19. The method of claim 18, wherein storing the encrypted data in the memory chip comprises storing the encrypted data by a data unit.

20. The method of claim 19, further comprising:
storing the encrypted data in a FIFO memory of the memory card.

21. The method of claim 20, further comprising:
receiving initialization keys from a central processing unit of the memory card; and
generating the encrypted XOR keys when receiving the data write command and the data read command based on the initialization keys.

22. The method of claim 21, wherein the same encrypted XOR keys are generated in response to the same initialization keys.

23. The method of claim 22, wherein the initialization keys used for encrypting the data are used for decoding the encrypted data.

24. The method of claim 23, further comprising:
storing the initialization keys.

25. The method of claim 23, wherein the encryption key generator does not receive the initialization keys after generating a first encrypted XOR key of the encrypted XOR keys, and receives the first encrypted XOR key of the encrypted XOR keys as an input to generate at least a second encrypted XOR key of the encrypted XOR keys.

26. The method of claim 25, further comprising:
storing the encrypted XOR keys in an XOR key FIFO of the encryption key generator.

27. The method of claim 26, further comprising:
generating a first control signal and a second control signal in response to receiving the data write command and the write address,
wherein performing the XOR operation comprises:
outputting the data from the FIFO memory in response to the first control signal; and
outputting the encrypted XOR keys from the XOR key FIFO memory in response to the second control signal.

28. The method of claim 27, further comprises:
detecting data errors while transmitting the encrypted data to the memory chip; and
calculating and storing an error correction value corresponding to the encrypted data.

29. The method of claim 28, wherein the XOR operation is performed on second m-bit data (m being a positive integer) using a second m-bit encrypted XOR key (n being a positive integer) to obtain second m-bit encrypted data, while first m-bit encrypted data, encrypted using a first m-bit encrypted XOR key, is being stored in the memory chip by a memory interface.

30. The method of claim 29, wherein generating the XOR keys further comprises:
reading the encrypted data from the memory chip in the memory interface according to the data read command and the data read address.

31. The method of claim 30, wherein reading the encrypted data from the memory chip further comprises:
correcting data transmission errors according to the stored error correction value when transmitting the encrypted data from the memory interface.

32. The method of claim 31, wherein reading the encrypted data from the memory chip further comprises:
generating a third control signal in response to receiving the data read command and the data read address,
wherein performing the XOR operation comprises:
outputting the encrypted data from the memory interface in response to the third control signal; and
outputting the encrypted XOR key from the XOR key FIFO memory in response to the second control signal.

33. The method of claim 32, wherein transmitting the decoded data further comprises storing the decoded data in the FIFO memory.

* * * * *